(12) United States Patent
Singhal et al.

(10) Patent No.: US 11,629,984 B2
(45) Date of Patent: Apr. 18, 2023

(54) X-RAY MASS FLOW RATE SENSORS FOR HIGH PRESSURE PROCESSES

(71) Applicant: BOARD OF REGENTS, THE UNIVERSITY OF TEXAS SYSTEM, Austin, TX (US)

(72) Inventors: Vivek Singhal, Austin, TX (US); Eric Van Oort, Bee Cave, TX (US); Pradeepkumar Ashok, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 371 days.

(21) Appl. No.: 17/046,073

(22) PCT Filed: Apr. 5, 2019

(86) PCT No.: PCT/US2019/025943
§ 371 (c)(1),
(2) Date: Oct. 8, 2020

(87) PCT Pub. No.: WO2019/199590
PCT Pub. Date: Oct. 17, 2019

(65) Prior Publication Data
US 2021/0033442 A1 Feb. 4, 2021

Related U.S. Application Data

(60) Provisional application No. 62/654,633, filed on Apr. 9, 2018.

(51) Int. Cl.
*G01N 23/12* (2018.01)
*G01F 1/74* (2006.01)
*G01F 1/667* (2022.01)

(52) U.S. Cl.
CPC ............... *G01F 1/74* (2013.01); *G01N 23/12* (2013.01); *G01F 1/667* (2013.01); *G01N 2223/423* (2013.01)

(58) Field of Classification Search
None
See application file for complete search history.

(56) References Cited

U.S. PATENT DOCUMENTS 5,689,540 A 11/1997 Stephenson et al.
6,526,120 B1 2/2003 Gray et al.
(Continued)

FOREIGN PATENT DOCUMENTS

GB 2562993 12/2018

OTHER PUBLICATIONS

International Search Report and Written Opinion dated Jun. 20, 2019, from International Application No. PCT/US2019/025943, 9 pages.

(Continued)

*Primary Examiner* — Harshad R Patel
(74) *Attorney, Agent, or Firm* — Meunier Carlin & Curfman LLC

(57) ABSTRACT

An x-ray mass flow rate sensor uses a low density polymer pipe, an x-ray source, and an x-ray detector. The polymer pipe has a low density (less than 2.8 SG) and a high pressure rating (greater than 5 ksi). By using a low density polymer pipe, the sensor is able to use an x-ray source that does not require a linear accelerator and is less than or equal to 450 kV. The x-ray source and the x-ray detector are mounted on opposite sides of the polymer pipe to form a detection area that passes through the polymer pipe. A real-time calibration of the sensor is performed by detecting gray level values in a calibration region of the detection area for two reference materials placed in the detection area. The sensor may additionally include a mechanical flow rate sensor with a plurality of pistons with springs of varying spring constants.

20 Claims, 9 Drawing Sheets

(56) References Cited

U.S. PATENT DOCUMENTS

2005/0084069 A1    4/2005   Du et al.
2012/0087467 A1    4/2012   Tjugum
2013/0036831 A1    2/2013   Kullenberg et al.
2015/0355115 A1   12/2015   Mustafina et al.

OTHER PUBLICATIONS

Singhal, V. et al. "A Novel X-Ray Based High Pressure Mass Flow Rate Sensor for MPD Operations", Society of Petroleum Engineers, SPE Annual Technical Conference and Exhibition, Sep. 2018.

Singhal, V. "Design and Development of an X-ray Sensor to Measure the Density and Flow Rate of Drilling Fluids in High Pressure Lines", Dissertation, The University of Texas at Austin, 2018.

Singhal, V. et al. "Advanced X-ray Technology for Real-Time High Pressure Mass Flow Rate Measurement", AADE-18-FTCE-126, 7 pages.

Singhal, V. et al. "X-ray densitometry of drilling fluids at the rig standpipe", Journal of Petroleum Science and Engineering 181 (2019) 106147.

Singhal, V. et al. "A Novel X-Ray Based High Pressure Mass Flow Rate Sensor for MPD Operations", SPE-191595-MS, Society of Petroleum Engineers, 2018.

Singhal, V. et al. "High pressure measurement of mud density and flow rate for oil and gas well construction: Making the case for X-Ray metering", Journal of Petroleum Science and Engineering 177 (2019) 104-122.

X-RAY MASS FLOW RATE SENSORS FOR HIGH PRESSURE PROCESSES

CROSS-REFERENCE TO RELATED APPLICATIONS

This application is a national stage application filed under 35 U.S.C. § 371 of PCT/US2019/025943 on Apr. 5, 2019, which claims the benefit of U.S. Provisional Patent Application Ser. No. 62/654,633 filed Apr. 9, 2018, the disclosures of which are expressly incorporated herein by reference.

BACKGROUND

Accurately measuring mass flow rate in real-time of high pressure processes (>3500 psi) has remained elusive. For example, in oilfield drilling operations, drilling contractors still primarily rely on the antiquated pressurized mud density cup and a pump stroke counter on a mud pump for this "measurement" of flow into the well. Gamma ray densitometer use has been limited due to its radioactive source and slow response times (~1 reading per minute). A metering technology that shows good performance is the continuously excited clamp-on transit time ultrasonic flowmeter. However, the meter accuracy is in a 95-99% range and deteriorates towards the lower end of its flow rate. Results from real-time volumetric meters have at best been marginal.

SUMMARY

In various implementations of the pending disclosure an x-ray mass flow rate sensor is provided. The sensor comprises a polymer pipe having a density less than 2.8 SG, an x-ray source coupled to the polymer pipe and configured to emit an x-ray beam therethrough, and an x-ray detector coupled to the polymer pipe and arranged to detect x-rays from the x-ray beam after having passed through the polymer pipe, the x-ray detector configured to produce a measure of intensity of x-rays received from the x-ray source. The sensor also includes a calibration rod coupled to the polymer pipe and arranged within a path of the polychromatic x-ray beam, the calibration rod comprising two materials of known density.

In some implementations, the x-ray mass flow rate sensor further comprising a flow rate mechanism coupled to the polymer pipe, the flow rate mechanism comprising a piston and a spring, wherein the piston of the flow rate mechanism is arranged within a path of the x-ray beam. The piston is configured to be displaced along a displacement path and compress the spring proportional to a mass flow rate of a fluid through the polymer pipe. The flow rate mechanism comprises a plurality of pistons with a respective plurality of springs, each of the pistons are arranged within a path of the x-ray beam.

In any of the above implementations of the x-ray mass flow rate sensor, the x-ray beam is a polychromatic x-ray beam.

In any of the above implementations of the x-ray mass flow rate sensor, the polymer pipe has a density between 1.3-1.7 SG and a pressure rating of greater than or equal to 7500 psi.

In any of the above implementations of the x-ray mass flow rate sensor, the x-ray source is less than or equal to 450 kV. In some implementations, the x-ray source draws less than or equal to 6000 W.

In any of the above implementations of the x-ray mass flow rate sensor, the calibration rod extends for the length of the diameter of the polymer pipe. The calibration rod comprises a rod of a first of the two materials of known density surrounded by a ring of a second of the two materials of known density. A diameter of a first end of the calibration rod is smaller than a diameter of a second end of the calibration rod.

In any of the above implementations of the x-ray mass flow rate sensor, the x-ray detector is configured to produce the measure of intensity of x-rays received from the x-ray source at a frequency of 1 Hz.

In any of the above implementations of the x-ray mass flow rate sensor, the x-ray detector is a charge coupled device (CCD) image sensor or a photomultiplier tube (PMT).

In any of the above implementations of the x-ray mass flow rate sensor, the sensor further comprises a processor configured to receive the measure of intensity of x-rays received from the x-ray source produced by the x-ray detector. The processor is configured to produce an average gray level (GL) value of indicative of an average intensity of x-rays received from the x-ray source in each of a plurality of regions of a detection area. The plurality of regions comprise a calibration region, a density measurement region, and a flow rate region. The calibration region comprises a first area that measures x-ray attenuation through a first of the two materials of known density to produce a reference high GL value and a second area that measures x-ray attenuation through a second of the two materials of known density to produce a reference low GL value. The processor is configured to determine a density of a material flowing through the polymer pipe based on a density GL value determined from the density measurement region. The processor is configured to determine a mass flow rate of the material flowing through the polymer pipe based upon the density and a flow rate determined based on a flow rate GL value determined from the flow rate region. The density GL value and the flow rate GL value are calibrated based on the reference high GL value and the reference low GL value. The processor is configured to process the flow rate region to determine a velocity of a tracer material traversing the flow rate region.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
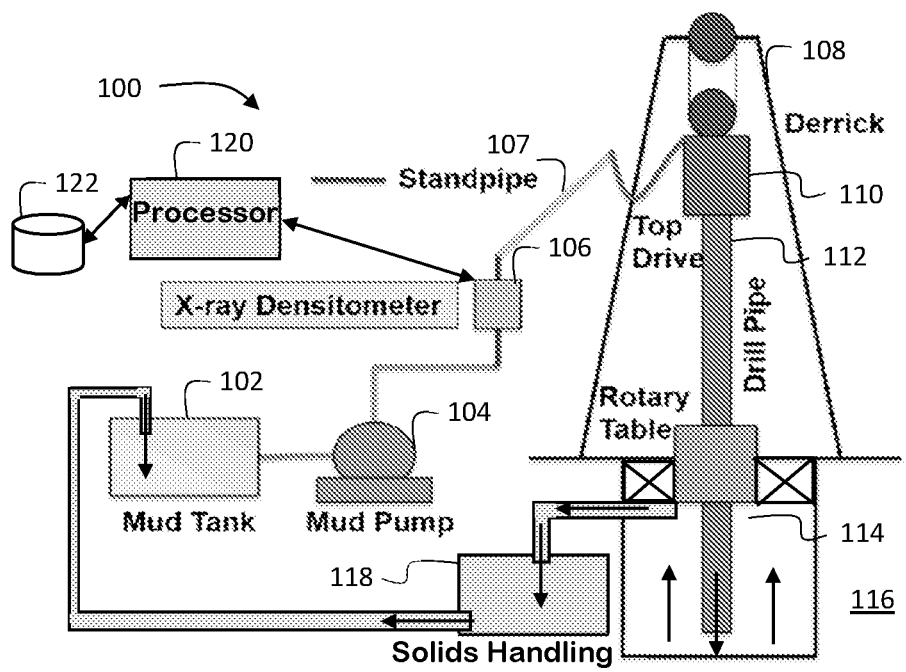
FIG. 1 illustrates an exemplary drilling rig with an x-ray mass flow rate sensor suitable for implementing the several embodiments of the disclosure.
Figure 2A:
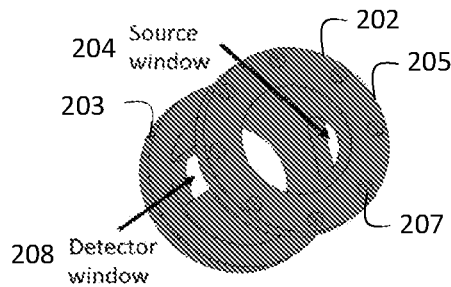
FIGS. 2A-2D illustrate an exemplary implementation of the x-ray mass flow rate sensor suitable for implementing the several embodiments of the disclosure.
Figure 2B:
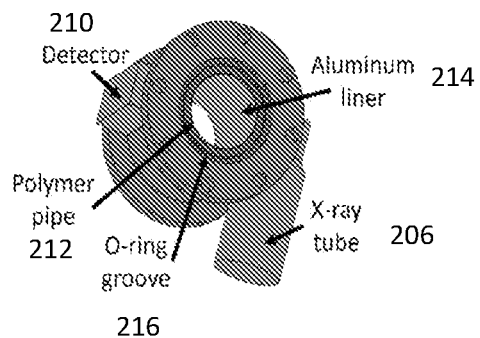
Figure 2C:
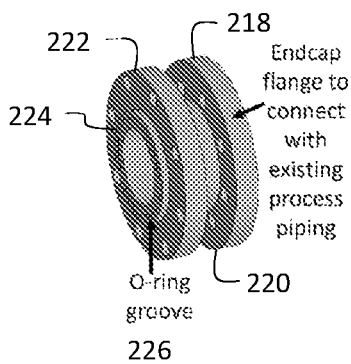
Figure 2D:
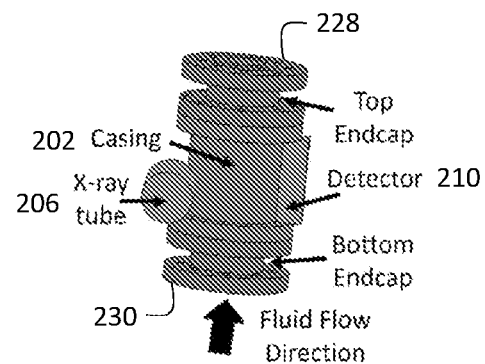

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A, B, and/or C" means "A", or "B", or "C", or "A and B", or "A and C", or "A and B and C".

High unit cost operations such as deepwater well construction can greatly benefit from improvement in mass flow rate measurement accuracy at the well inlet, particularly if measurement data can be obtained at 99% accuracy or greater at 1 Hz frequency. Improved measurement accuracy translates to increased rate of penetration, fewer tripping operations, reduction in non-productive time and early kick detection, all of which directly impact either the bottom-line or safety. Furthermore, with better control over the near well bore pressure profile, it will become possible to access very challenging prospects with hard to drill formations and narrow drilling margins.

X-ray technology shows great promise because it is based on the proven principles of gamma ray densitometry, which can measure density with greater than 99% accuracy. In the past it has not been economically or logistically practical to use x-rays for mass flow rate measurements through the high pressure standpipe. The standpipe is typically constructed of carbon steel which has a density of about 8 g/cm3. For a 4" ID standpipe with a pressure rating of 7500 psig, the wall thickness approaches one inch. With a 20 ppg mud flowing through this pipe the x-ray tube will have to be powered using a linear accelerator. The cost, size, weight, safety, and operational constraints of linear accelerators are not conducive to the drilling environment. X-ray sources that are readily available in the industry and do not require linear accelerators max out at about 450 kV. Therefore, x-ray sensors are not suitable for mass flow rate measurements in typical high pressure processes that use thick pipes constructed of carbon steel or other such high density materials. For example, current steel standpipes may have a density of about 8 SG.

Accordingly, the x-ray mass flow rate sensor of the pending application uses a low density polymer pipe, an x-ray source, and an x-ray detector. For example, the polymer pipe may be a carbon reinforced polymer (CRP) pipe. Generally, the polymer pipe has a low density (e.g., less than or equal to 2.8 SG) and a high pressure rating (e.g., greater than 7.5 ksi). In some implementations, the polymer pipe has a density less than 2.6 SG. For example, in some implementations, the CRP pipe has a density of between 1.3-1.7 SG and a pressure rating between 5-20 ksi. Such polymer pipes have the same wall thickness to pressure rating as that of steel and have a density that is as much as 5.3 factors smaller than that of steel (1.5 SG). In some implementations, a low density pipe that is not a polymer pipe may be used.

By using a low density polymer pipe, the x-ray based mass flow rate sensor of the pending application is able to use an x-ray source that does not require a linear accelerator. That is, the x-ray mass flow rate sensor of the pending application uses an x-ray source with less than or equal to 450 kV. In some implementations, the x-ray source is a 320 kV source that draws about 1500 W. In some implementations, the x-ray source is a 225 kV source that draws less than or equal to 6000 W. In various implementations, the x-ray source is a polychromatic x-ray energy source given its lower cost, size and complexity compared with a monochromatic energy source. However, in some implementations, a monochromatic x-ray source may be used.

The x-ray source and the x-ray detector are mounted on opposite sides of the polymer pipe to form a detection area that passes through the polymer pipe. The x-ray detector is a charge coupled device (CCD) or scintillator detector configured to produce radiograph images of the detection area, where the gray level (GL) values of the radiograph images correspond to the intensity and/or number of x-rays received at a given location in the detection area. Other x-ray detectors may be used, such as a photo multiplier tube, an ionization chamber, or the like.

To obtain repeatable measurement data (density or flow-rate), a real-time calibration of the x-ray measurement sensor is performed. Real-time calibration adjusts for the constant state of flux induced by the x-ray source output and primarily the x-ray detector output. The real-time calibration is performed by detecting GL values of two reference materials placed in the detection area. The detection area includes two regions for calibration measurements (RCM). The RCM includes a first calibration region for detecting the GL values for a first reference material. The RCM includes a second calibration region for detecting the GL values for a second reference material. Average GL values are measured in each of the first and second calibration regions by averaging all the pixel values in each respective region to a single calibration GL value. That is, a first calibration GL value is measured for the first calibration region and a second calibration GL value is measured for the second calibration region. More than two reference materials may be used for generating non-linear calibration transfer functions depending on the material and density range to be detected.

The calibration GL values of the reference materials serve as a reference high and reference low value in a given radiograph to provide for two-point calibration. A two-point calibration, which provides slope and offset correction, was selected in favor of a one-point calibration (provides offset correction only) because the observed impact of system fluctuations on the GL values was both additive and multiplicative.

The detection area includes one or more regions for density measurements (RDM). Average intensity values, also referred to as average GL values, are measured by averaging all the pixel values across the RDM to a single density GL value. Units of intensity 'I' are therefore expressed in GL. Density of the process material flowing through the x-ray mass flow rate sensor is calculated using the Beer Lambert's law and the x-ray intensity information from the RDM, as discussed in more detail below.

The detection area includes one or more regions for flow measurements (RFM). Flow measurements may be determined by a mechanical measurement system whose motion is imaged and used to determine the flow rate of process material flowing through the x-ray mass flow rate sensor. The mechanical measurement system is placed within the RFM of the detection area of the x-ray mass flow rate sensor. As above, an average flow rate GL value is measured by averaging all the pixel values across the RFM.

The mechanical measurement system includes a piston coupled to a guide post with a spring mounted thereon. The piston is configured to attenuate the intensity of x-rays passing therethrough. For example, the piston is constructed as an aluminum or steel block. Other geometries of the piston may be used, such as a cylinder, for example. In some implementations, the piston is constructed as an aluminum block coated with an abrasion resistant coating material. The spring applies a spring force against the piston to maintain the piston in an extended position along the guide post. The flowing of the process material applies a flow force against the piston in opposition to the spring force. Accordingly, the piston is displaced along the guide post for a distance that is proportional to the flow rate of the process material.

As the piston is displaced along the guide post, fewer x-rays from the x-ray source pass through the piston before being detected in the RFM. Therefore, as the flow rate of the process material increases, the flow rate GL value likewise increases due to the increase amount of x-rays reaching the RFM. As the flow rate of the process material decreases, the flow rate GL value likewise decreases due to the attenuation of x-rays from the piston before reaching the RFM. In various implementations, more than one piston may be used, each with a spring with a different spring constant, in the mechanical measurement system to increase the resolution of the mechanical measurement system.

Flow measurements may alternatively be determined by measuring the movement of one or more tracers along the RFM. For example, a tracer material, such as tungsten carbide beads, bubbles, or other such material detectable by x-rays, may be introduced into the process material. In some implementations, high gravity solids (HGS) introduced into the process material may be used as tracer materials. Upon a tracer material being detected in a first radiograph image in the RFM, the tracer material may be tracked over time in subsequent images to determine a velocity of the tracer material and hence a flow rate of the process material.

FIG. 1 illustrates an exemplary drilling rig 100 with an x-ray mass flow rate sensor 106 suitable for implementing the several embodiments of the disclosure. The drilling rig 100, such as an oil or gas drilling rig, includes a mud tank 102 that is kept at atmospheric pressure and maintains a supply of drilling mud suitable for a drilling operation. The drilling mud includes a solvent, high gravity solids (HGS) that are added to the drilling mud to adjust the density of the drilling mud. If the density of the drilling mud is to be raised, additional HGS are added to the drilling mud. If the density of the drilling mud is to be reduced, additional solvent is added to the drilling mud. Additionally, during operation, low gravity solids (LGS) may be entrained within the drilling mud and may affect the density of the drilling mud over time.

The drilling mud is pumped by a mud pump 104 through a standpipe 107 to a top drive 110 of a derrick 108. The drilling mud is pumped at high pressure between 5-20 ksi, such as 7.5 ksi. The drilling mud is then injected into the anulus of a wellbore 114 through a formation 116. The drilling mud is circulated through the top of the wellbore 114 to a solids handling system 118 at atmospheric pressure. The solids handling system 118 treats the drilling mud to remove formation cuttings, gas, and perform other such treatment of the drilling mud so that it is suitable for continued use in the drilling operation. Upon completion of treatment, the drilling mud is circulated back to the mud tank 102 for continued use. As noted above, through operation, the drilling mud accumulates LGS as non-soluble contaminants that are not removed from the drilling mud by the solids handling system 118. Over time, the accumulation of LGS change the density of the drilling mud, thereby impacting the drilling operation and performance.

As shown in FIG. 1, the x-ray mass flow rate sensor 106 is positioned between the outlet of the mud pump 104 and the standpipe 107. The x-ray mass flow rate sensor 106 produces radiographic images that are communicated to a processor 120 to calculate a density and flow rate of the drilling mud circulating through the x-ray mass flow rate sensor 106. The processor 120 is in communication with a database 122 for storing the radiographic images and/or look-up tables used in the calculation of the density and flow rate of the drilling mud. The processor 120 may be incorporated in the x-ray mass flow rate sensor 106 of provided remote from the x-ray mass flow rate sensor 106 via one or more wired and/or wireless communication links. The database 122 may be local to or remote from the processor 120.

FIGS. 2A-2D illustrate an exemplary implementation of the x-ray mass flow rate sensor 106 suitable for implementing the several embodiments of the disclosure. The x-ray mass flow rate sensor 106 includes a casing 202 with a top endcap flange 203 and a bottom endcap flange 205, each of which includes a plurality of bolt holes 207. The casing 202 is an API rated steel casing, such as a carbon steel casing with a density of about 8 g/cm$^3$. The casing 202 includes a circular x-ray source window 204 and a rectangular x-ray detector window 208 cut into opposite sides of the body of the casing 202. An x-ray source 206 is mounted in the x-ray detector window 208 and configured to emit x-rays. An x-ray detector 210 is mounted in the x-ray detector window 208 and configured to detect x-rays emitted by the x-ray source 206. The casing 202 is designed with the source window 204 positioned relative to the detector window 208 such that x-rays travelling from the x-ray source 206 to the x-ray detector 210 do not encounter the steel.

The x-ray source 206 does not require a linear accelerator and is sized to be less than or equal to 450 kV. In some implementations, the x-ray beam emitted by the x-ray source 206 has a radiation coverage of 90°×30°. In some implementations, the x-ray source 206 may be a fan beam or a cone beam source. In some implementations, the x-ray source 206 is a 320 kV source that draws about 1500 W. In some implementations, the x-ray source 206 is a 225 kV source that draws less than or equal to 6000 W. In various implementations, the x-ray source 206 is a polychromatic x-ray energy source given its lower cost, size and complexity compared with a monochromatic energy source. However, in some implementations, the x-ray source 206 is a monochromatic x-ray source. The x-ray detector 210 is a charge coupled device (CCD) or scintillator detector configured to produce radiograph images based on the detected x-rays. A gray level (GL) value of the pixels in the radiograph images correspond to the intensity and/or number of x-rays received at a given location on the x-ray detector 210. In some implementations, the x-ray detector 210 detects radiograph images at a frequency of 1 Hz.

A polymer pipe 212 is press-fit within the inside diameter of the casing 202. The polymer pipe 212 may be a carbon reinforced polymer (CRP) pipe. The CRP pipe may be constructed of PEEK or PVDF. In some implementations, the polymer pipe 212 may be an m-pipe® produced by magma® or a carbon-PVDF thermoplastic composite pipe (TCP) produced by Airborne® Oil & Gas. The pressure rating of the polymer pipe 212 per unit thickness is comparable to that of steel. In some implementations, the polymer pipe 212 has an inside diameter of four inches and is one inch thick. Accordingly, the inside diameter of the casing 202 is five inches. Other diameter pipes and dimensions may be used. In some implementations, the polymer pipe 212 may have a diameter of up to 10 inches. Generally, the polymer pipe 212 has a low density (e.g., less than or equal to 2.8 SG) and a high pressure rating (e.g., greater than 7.5 ksi). For example, in some implementations, the CRP pipe 212 has a density of between 1.3-1.7 SG and a pressure rating between 5-20 ksi. In some implementations, the pressure rating is 15, ksi. In some implementations, the pressure rating is greater than 10 ksi. The polymer pipe 212 have the same wall thickness to pressure rating as that of steel and have a density that is as much as 5.3 factors smaller than that of steel (1.5 SG).

In some implementations, the polymer pipe 212 contains a replaceable abrasion resistant liner 214. The abrasion resistant liner 214 may be an aluminum liner. In some implementations, the abrasion resistant liner 214 may also serve to facilitate beam hardening of the polychromatic x-ray beam emitted from the x-ray source 206. In some implementations, additional copper or aluminum filters may be used to facilitate beam hardening.

A flanged end cap 218 is used to encapsulate the polymer pipe 212 in the casing 202. The endcap 218 includes a first flange 220 that can bolt to existing piping and a second flange 222 that can bolt to the top endcap flange 203 and bottom endcap flange 205, respectively. The second flange 222 includes a raised surface 224 with an outside diameter equal to the inside diameter of the casing 202. An O-ring groove is cut into a face of the raised surface 224. Likewise, at a corresponding location, the polymer pipe 212 includes an O-ring groove 216 on a surface of the distal ends of the polymer pipe 212. The endcap 218 and polymer pipe 212 are mated using an O-ring seal seated in the O-ring grooves 216, 226. The O-ring seal prevents high pressure process material from leaking into the gaps between the casing 202 and polymer pipe 212. When assembled, a top endcap 228 is bolted to the top endcap flange 203 and a bottom endcap 230 is bolted to the bottom endcap flange 205.

A flow of the process material through the x-ray mass flow rate sensor 106 may enter from the bottom endcap 230, pass through the polymer pipe 212 in the casing 202, and exit from the top endcap 228. In the implementation of FIG. 1, the process material is the drilling mud, where the bottom endcap 230 is bolted to an outlet of the mud pump 104 and the top endcap 228 is bolted to the standpipe 207. In some implementations, the polymer pipe 212 includes flanged ends that can bolt to existing piping. In such implementations, the endcaps 218 and O-rings may not be used and a mounting bracket may be affixed to the polymer pipe 212 to mount the x-ray source 206 and x-ray detector 210 to the polymer pipe 212.

Figure 3A:
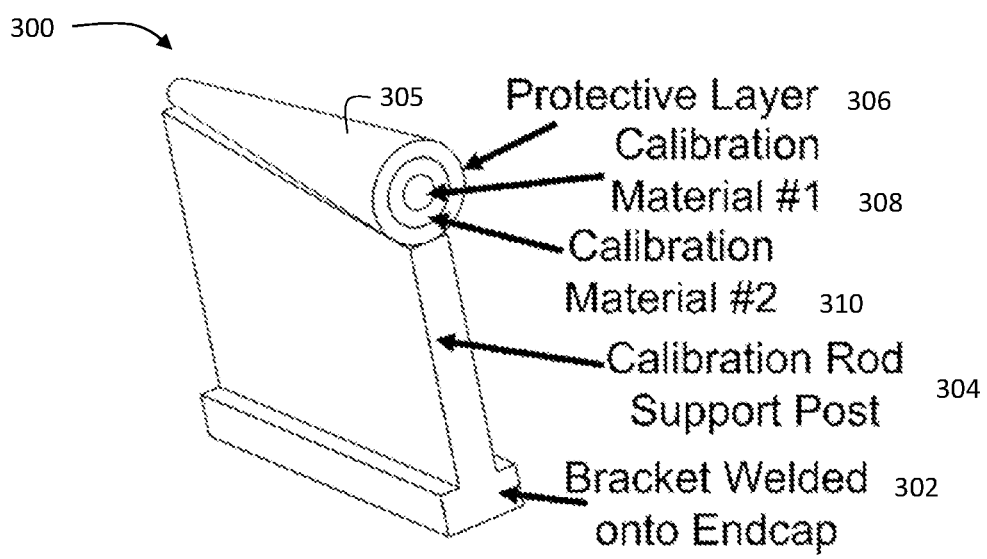
FIG. 3A illustrates an exemplary calibration mechanism for the x-ray mass flow rate sensor suitable for implementing the several embodiments of the disclosure.

FIG. 3A illustrates an exemplary calibration mechanism 300 for the x-ray mass flow rate sensor 106 suitable for implementing the several embodiments of the disclosure. The calibration mechanism 300 includes a bracket 302 that is welded onto the bottom endcap 230. A calibration rod support post 304 extends from the bracket into the polymer pipe 212 at a location between the x-ray source 206 and the x-ray detector 210. A calibration rod 305 is mounted to an end of the support post 304.

The calibration rod 305 includes concentric rods of calibration material covered by an abrasion resistant protective layer 306. A central rod of calibration material 308 includes calibration material of a first density. A ring of calibration material 310 surrounds the central rod of calibration material 308 and includes a calibration material of a second density. Other geometries and configurations of the calibration materials may be used, such as adjacent rods of calibration material as opposed to concentric rods of calibration material shown. The first density and the second density are known densities and are different from one another to provide a reference high and a reference low point for two-point calibration, discussed in more detail below. In some implementations, the first density is less than the second density. The calibration rod 305 may include more than two calibration materials for generating non-linear calibration transfer functions depending on the material and density range to be detected.

The calibration rod 305 has a first diameter at a first end and a second diameter at a second end, where the second diameter is greater than the first diameter. A first face of the calibration rod 305 on the end with the first diameter faces towards the x-ray source 306 and a second face of the calibration rod 305 on the end with the second diameter faces towards the x-ray detector 310. The diameter of the calibration rod 305 increases from the first face to the second face at a rate equal to the beam angle from the x-ray source 206. The calibration rod 305 is centered at the x-ray source 206 and sits flush with the liner 214 in the polymer pipe 212 to avoid any contribution to x-ray attenuation by the process material flowing through the x-ray mass flow rate sensor 106.

Figure 3B:
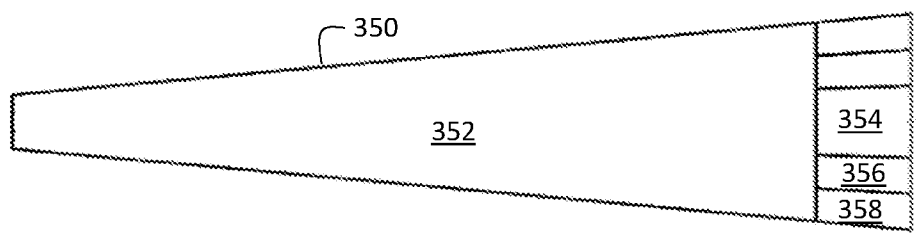
FIG. 3B illustrates a cross-sectional view of an alternative construction for a calibration rod for the calibration mechanism suitable for implementing the several embodiments of the disclosure.

FIG. 3B illustrates a cross-sectional view of an alternative construction for a calibration rod 350 for the calibration mechanism 300 suitable for implementing the several embodiments of the disclosure. As shown, the calibration rod 350 includes a large area 352 of a first calibration material of known density. The area 352 is positioned within the calibration rod 350 on a side closest to the x-ray source 206. The calibration rod 350 also includes a disk 354 of known density, a ring 356 of known density, and a protective ring 358. The disk 354 may be made an aluminum disk, the ring 356 may be a copper ring, and the protective ring 358 may be a low density or very hard material for protection of the disk 354 and the ring 356. The area 352 includes a material with a lower density than the disk 354, the ring 356, or the protective ring 358. Other geometries and materials may be used.

Figure 4A:
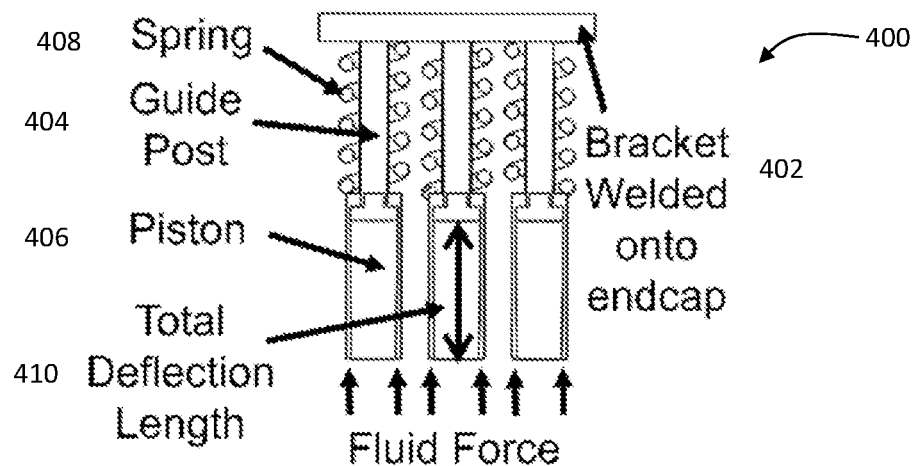
FIGS. 4A-4B illustrate an exemplary flow rate mechanism for the x-ray mass flow rate sensor suitable for implementing the several embodiments of the disclosure.
Figure 4B:
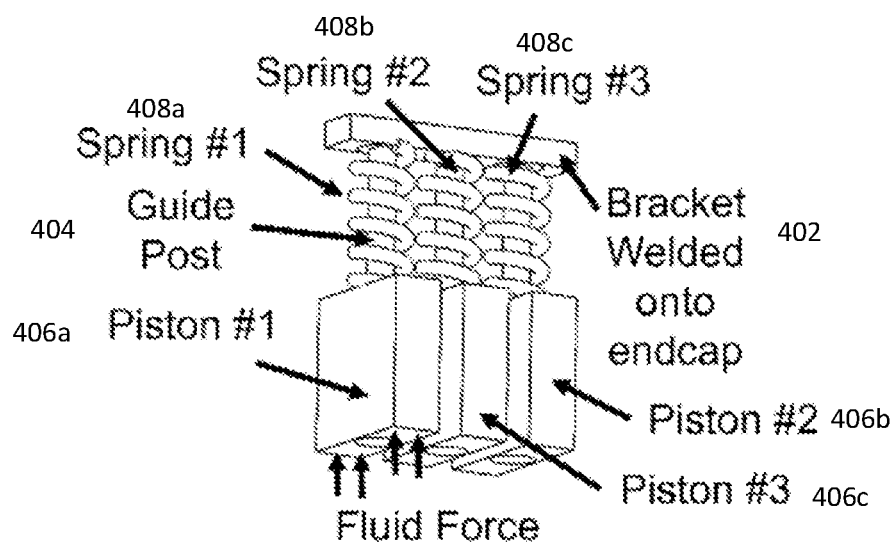

FIGS. 4A-4B illustrate an exemplary flow rate mechanism 400 for the x-ray mass flow rate sensor 106 suitable for implementing the several embodiments of the disclosure. The flow rate mechanism includes a bracket 402 that is welded onto the top endcap 228. A plurality of guide posts 404 extend from the bracket 402 into the polymer pipe 212 at a location between the x-ray source 206 and the x-ray detector 210. A piston 406 is mounted to each of the guide posts 404 with a spring 408 around the guide posts 404 and coupled between the bracket 402 and the piston 406. For example, as shown in FIG. 4B, springs 408a, 408b, 408c are mounted on the guide posts 404 between pistons 406a, 406b, 406c and the bracket 402, respectively. The piston 406 is configured to attenuate the intensity of x-rays passing therethrough. For example, the piston is constructed as an aluminum or steel block. Other geometries of the piston may be used, such as a cylinder, for example. In some implementations, the piston is constructed as an aluminum block coated with an abrasion resistant coating material. The spring 408 applies a spring force against the piston 406 to maintain the piston in an extended position along the guide post. The flowing of the process material applies a flow force against the piston in opposition to the spring force. Accordingly, the piston 406 is displaced along the guide post for a distance along a total deflection length 410 that is proportional to the flow rate of the process material. In some implementations, the deflection length is 6 cm. While shown with three pistons, the flow rate mechanism 400 may include more or fewer pistons depending on the flow rate resolution required for a particular application.

Each of the springs 408a, 408b, 408c may have a different spring constant. In some implementations, the spring 408 mounted closest to the x-ray source 206 has the largest spring constant. Likewise, the spring 408 mounted closes to the x-ray detector 210 has the smallest spring constant. Other arrangements in the order of the springs 408 may be used. Therefore, for a given flow rate of the process material, the deflection distance for each of the pistons is different. By providing springs 408 with different spring constants, the resolution of the flow rate mechanism 400 is increased—effectively increasing the total measurable deflection length to be a product of the total deflection length 410 of a single piston and the number of pistons used on the flow rate mechanism 400.

Figure 5:
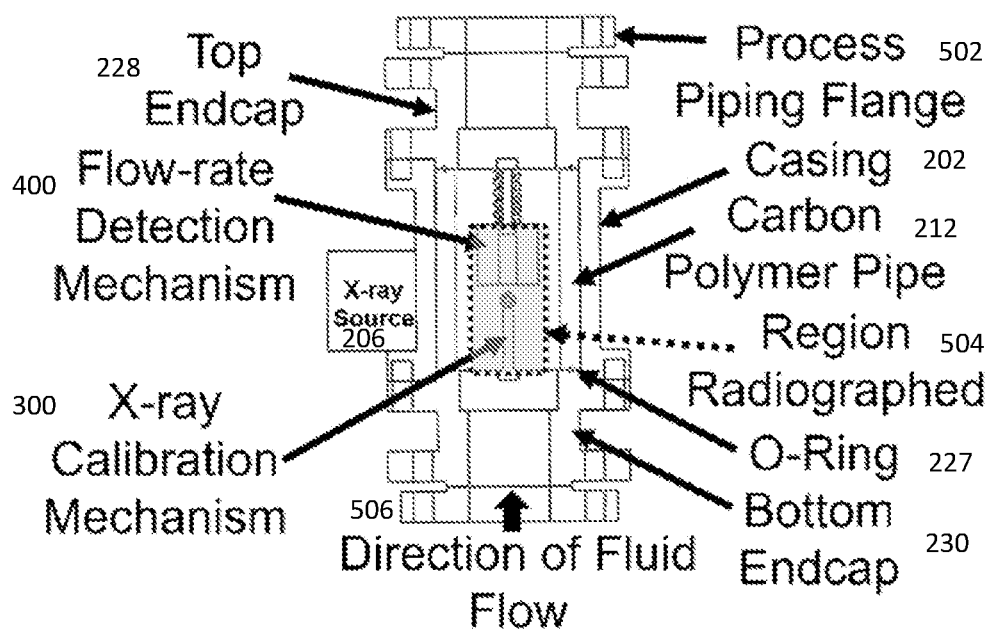
FIG. 5 illustrates a cross-sectional view of the x-ray mass flow rate sensor suitable for implementing the several embodiments of the disclosure.

FIG. 5 illustrates a cross-sectional view of the x-ray mass flow rate sensor 106 suitable for implementing the several embodiments of the disclosure. The mass flow rate sensor 106 is connected to a process piping flange 502 via the top endcap 228, which in turn is connected to the casing 202. For example, the process piping flange 502 connects to the standpipe 107. Likewise, the mass flow rate sensor 106 is connected to a process piping flange 506 via the bottom endcap 230, which in turn is also connected to the casing 202. For example, the process piping flange 506 connects to the outlet of the mud pump 104. The x-ray source 206 is shown on the back side of the mass flow rate sensor 106 and the x-ray detector 210 is in the plane of the figure. As shown, the x-ray detector 210 detects the x-rays emitted from the x-ray source 206 in a detection area 504. The flow rate mechanism 400 and the calibration mechanism 300 are positioned within the polymer pipe 212 within the detection area 504. Accordingly, each radiographed image captured by the x-ray detector 210 includes information for calibrating the GL values of the image, determining a density of the process material, and determining a mass flow rate of the process material, as discussed in more detail below.

Figure 6A:
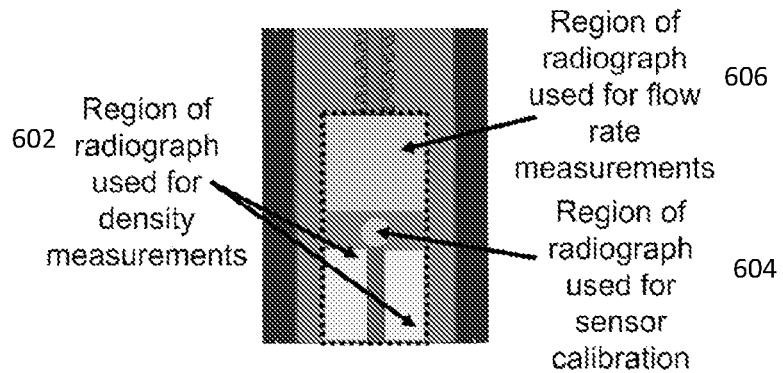
FIGS. 6A-6C illustrate detector regions of the x-ray detector for the x-ray mass flow rate sensor suitable for implementing the several embodiments of the disclosure.
Figure 6B:
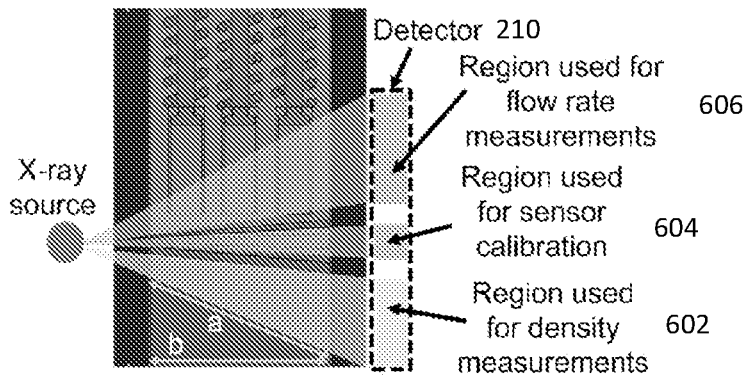
Figure 6C:
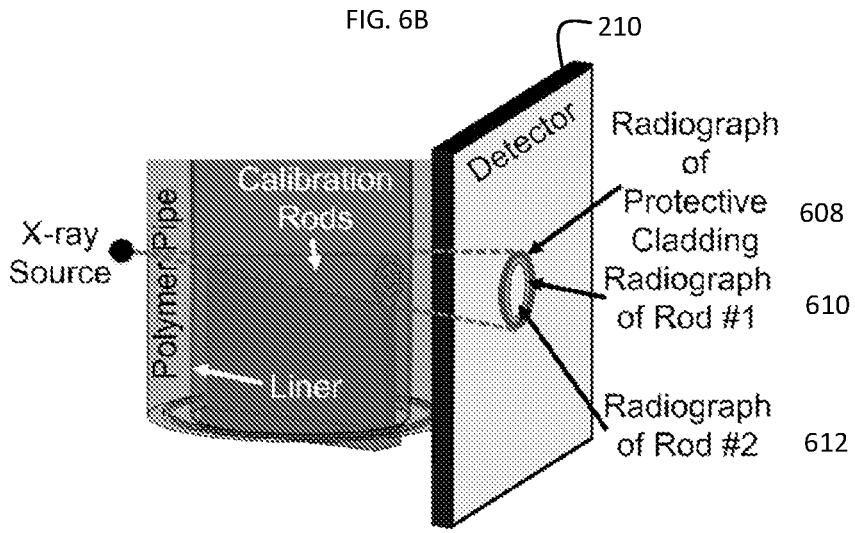

FIGS. 6A-6C illustrate detector regions of the x-ray detection area 504 for the x-ray mass flow rate sensor 106 suitable for implementing the several embodiments of the disclosure. The detection area 504 includes a plurality of regions for density measurements (RDM) 602, a region for calibration measurements (RCM) 604, and a region for flow measurements (RFM) 606. Processor 120 initially processes each radiographic image produced by the x-ray detector 110 by determining an average gray level (GL) value for each region based on all the pixel values in each respective region. For different types of x-ray detectors, different outputs may be produced. For a CCD imaging x-ray detector, the radiographic images described herein may be produced. For a scintillator or photo multiplier tube x-ray detector 110, the output may represent the intensity of impinging x-rays as a voltage or current. In some implementations, a separate scintillator or photomultiplier tube may be used for each of the detector regions of the x-ray detection area 504. For simplicity of the disclosure, all of the references to x-ray detector outputs as radiographic images may be substituted for other measures of an intensity of x-rays detected by the x-ray detector(s) 110. Accordingly, units of intensity 'I' of the x-rays detected by the x-ray detector 110 are expressed in GL values.

The RCM 604 is shown in the examples of FIGS. 6A-6C in a central location of the detection area 504. The RCM 604 includes a first calibration region 612 for detecting the GL values of x-rays passing through the central rod of calibration material 308. The RCM 604 also includes a second calibration region 610 for detecting the GL values for x-rays passing through the ring of calibration material 310 that surrounds the central rod of calibration material 308. As discussed above, the densities of the rod of calibration material 308 and the ring of calibration material 310 are different. Therefore, the GL values detected in the first and second calibration regions 610, 612 will be different.

In the example shown in FIG. 6C, the rod of calibration material 308 has a lower density than the ring of calibration material 310. Therefore, more x-rays pass through the rod of calibration material 308 and generate higher GL values, represented by the lighter shading. Likewise, less x-rays pass through the ring of calibration material 310 and generate lower GL values, represented by the darker shading. Substantially all of the x-rays passing through the protective cladding 306 are blocked and generate a ring of zero GL values in the region 608. Average GL values are measured by the processor 120 in each of the first and second calibration regions 610, 612 to determine a respective high and low reference value for calibrating the GL values of a given radiographic image produced by the x-ray detector 210. That is, a first calibration GL value is measured for the first calibration region 612 and a second calibration GL value is measured for the second calibration region 610.

The calibration GL values measured from the calibration regions 610, 612 serve as a reference high and reference low value in a given radiograph to provide for two-point calibration. A two-point calibration, which provides slope and offset correction, was selected in favor of a one-point calibration (provides offset correction only) because the observed impact of system fluctuations on the GL values was both additive and multiplicative.

In implementation, the two-point calibration is achieved by selecting the first calibration GL value and the second calibration GL value from an initial radiograph as a reference high and a reference low value, respectively. In subsequent radiographs, the measured first calibration GL value and the second calibration GL value are then adjusted to correlate to the reference values. For example, for a given subsequent radiograph, a transfer function is determined based on a difference between the first calibration GL value and the second calibration GL value measured in the subsequent radiograph and the reference high and low values from the initial radiograph. The transfer function includes a slope and offset based on the difference. The transfer function is then applied to the GL values of all the pixels in the subsequent radiograph. The operation is repeated in each subsequent radiograph, resulting in a distinct transfer function for each radiograph. In some implementations, the first and second calibration GL values are established based on an experiment ahead of obtaining any radiographic images.

To provide an effective transfer function, the density variation between the ring of calibration material 310 and the central rod of calibration material 308 should span the range of desired density measurements. In some implementations, the densities of the calibration materials 308, 310 are within the low (e.g., lower than half-way) end of the range of desired density measurements and within the high (e.g., higher than half-way) end of the range of desired density measurements. In some implementations, a density variation of approximately 25% between the calibration materials 308, 310 is used. In some implementations, a density variation of up to 100% or more between the calibration materials 308, 310 may be used The density of the calibration materials 308, 310 is less than the maximum penetration density for the x-ray source 206. That is, the density of the calibration materials 308, 310 is within the range of densities that x-rays emitted from the x-ray source 206 will be able to pass through and be detected by the x-ray detector 210.

In an example, experimental data from 13 mud samples each with a different density in the range of 9-10 ppg was used. The statistical analysis of density estimation based on the calibration describe above resulted in a mean error of 0.24% with a standard deviation of 0.32%. The error bound is between −0.18% and 1.09% with a median value of 0.26%.

The RDM 602 is shown in the examples of FIGS. 6A-6C in a lower location of the detection area 504 on either side of the calibration rod support post 304. As noted above, an average density GL value is determined based on all the pixel values in the RDM 602. The transfer function determined based on the RCM 604 may be applied to all of the individual pixels in the RDM 602 or to the determined average density GL value to produce a calibrated density GL value.

Density of the mud is calculated using the Beer Lambert's law (Equation 1) and the x-ray intensity information from the RDM.

$$I_{fluid} = I_0 * e^{-\mu_{m\_fluid} * \rho_{fluid} * t_{fluid\_density}}, \quad \text{Equation 1}$$

where, $I_{fluid}$ is the average x-ray intensity incident on RDM after attenuation by the fluid (e.g., the calibrated density GL value), $I_0$ is the average x-ray intensity incident on RDM through an empty polymer pipe 212, $\mu_{m\_fluid}$ is the mass attenuation coefficient of the homogeneous fluid (cm²/g) (e.g., the drilling mud or other process material), $\rho_{fluid}$ is the density of the homogeneous fluid (g/cm³), and $t_{fluid\_density}$ is the average proportion of fluid for density measurement (cm). Based on the above, the equation is solved for $\rho_{fluid}$ to determine the density of the process material. Two approaches for estimating a process material density from the calibrated density GL value include an empirical approach, described in more detail with reference to FIG. 7, and a model based approach, described in more detail with reference to FIG. 8.

Figure 7:
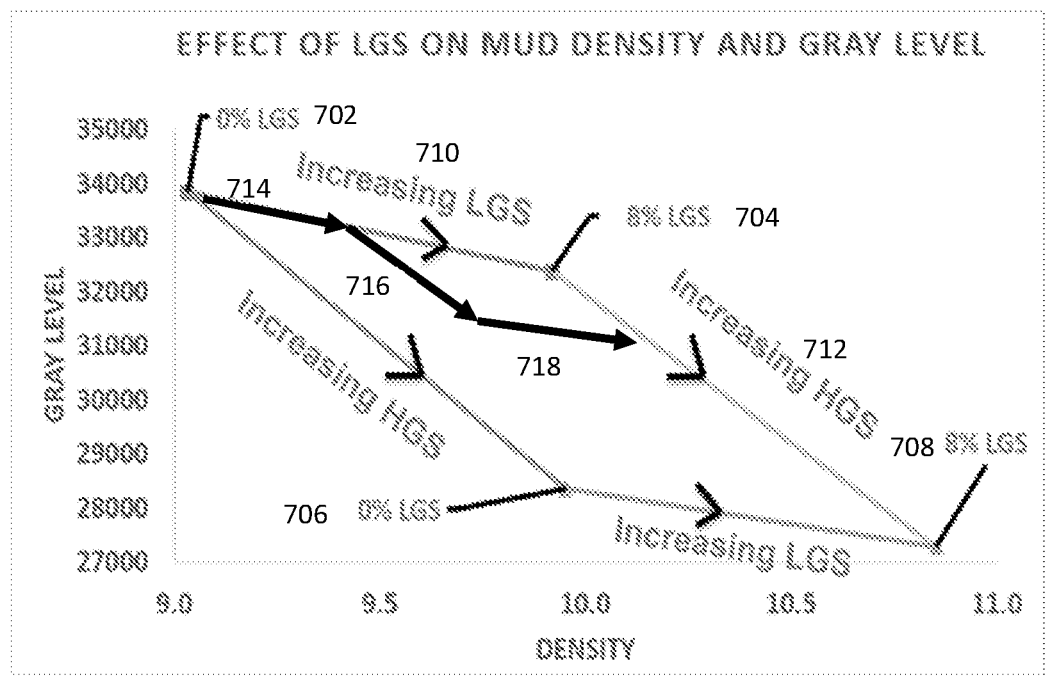
FIG. 7 illustrates an empirical method for determining a density of a process material flowing through the x-ray mass flow rate sensor suitable for implementing the several embodiments of the disclosure.

FIG. 7 illustrates an empirical method for determining a density of a process material flowing through the x-ray mass flow rate sensor 106 suitable for implementing the several embodiments of the disclosure.

The empirical approach creates a look-up table by mapping the calibrated density GL value onto process material density GL values obtained through in-lab experiments. The look-up table can then be used in the field to linearly interpolate process material density based on the real-time calibrated density GL value. The experiments were conducted to determine lab density GL values at an interval at which ensures greater than 99% in-field estimation accuracy using the look-up table. The look-up table may be maintained by the database 122 in the example shown in FIG. 1.

As shown in FIG. 7, four lab density GL values are determined. A first lab density GL value is determined for the process material, drilling mud in this example, with a baseline drilling mud solution. The baseline drilling mud solution may be said to contain no additional LGS and no additional HGS. As shown in FIG. 7, the baseline drilling mud solution 702 is shown with a density of approximately 9.0 SG and was found to have a baseline GL value of approximately 34,000.

A second lab density GL value is determined for the drilling mud with the addition of 8% LGS to the baseline drilling mud solution. As shown in FIG. 7, the LGS drilling mud solution 704 is shown with a density of approximately 10.0 SG and was found to have a LGS GL value of approximately 32,500. A third lab density GL value is determined for the drilling mud with the addition of HGS to the baseline drilling mud solution. As shown in FIG. 7, the HGS drilling mud solution 706 is shown with a density of approximately 10.0 SG and was found to have a HGS GL value of approximately 28,000. A fourth lab density GL value is determined for the drilling mud with the addition of both 8% LGS and HGS to the baseline drilling mud solution. As shown in FIG. 7, the combined drilling mud solution 708 is shown with a density of approximately 10.9 SG and was found to have a combined GL value of approximately 27,000.

Using these four lab density GL points determined in the lab, a line of increasing LGS 710 and a line of increasing HGS 712 are determined. In operation, only LGS or HGS are added to the drilling mud at a time. In the example of FIG. 1, LGS is added to the drilling mud through the drilling operation as described above by accumulating LGS contaminants from the wellbore. Likewise, HGS is added to the drilling mud in the solids handling system 118 to purposefully adjust the density of the drilling mud for the drilling operation.

The three bold arrows shown in FIG. 7 illustrate the determination of the density using the empirical method during operation of the drilling rig in FIG. 1. Initially, the drilling operation starts with the baseline drilling mud, which is shown at point 702. The drilling operation commences and the drilling mud is circulated through the drilling system 100, accumulating LGS contaminants during operation. Likewise, the mass flow rate sensor 106 captures radiographic images of the drilling mud, which are processed by the processor 120 to determine the calibrated density GL value. The processor 120 then compares the determined calibrated density GL value to the GL values in the look-up table in the database 122 along the line of increasing LGS 710 to determine the density of the drilling mud. For example, during this operation, the density of the drilling mud is determined based on the values along the first bold arrow 714.

Based on the operation of the drilling rig 100, it may be desirable to increase the density of the drilling mud, for example to better balance with the pressure in the wellbore 114. Accordingly, the solids handling system 118 adds HGS to the drilling mud, which is then circulated by the mud pump 104. Likewise, the mass flow rate sensor 106 captures radiographic images of the denser drilling mud, which are processed by the processor 120 to determine the calibrated density GL value. The processor 120 then compares the determined calibrated density GL value to the GL values in the look-up table in the database 122 along the line of increasing HGS 712 to determine the density of the drilling mud. For example, during this operation, the density of the drilling mud is determined based on the values along the second bold arrow 716. Therefore, the line of increasing HGS 712 is offset to intersect with the last known density of the drilling mud.

Upon obtaining the desired drilling mud density, normal operations of the drilling rig 100 continue, accumulating LGS contaminants during operation. The mass flow rate sensor 106 again captures radiographic images of the drilling mud, which are processed by the processor 120 to determine the calibrated density GL value. The processor 120 then compares the determined calibrated density GL value to the GL values in the look-up table in the database 122 along the line of increasing LGS 710 to determine the density of the drilling mud. For example, during this operation, the density of the drilling mud is determined based on the values along the first bold arrow 716. Therefore, the line of increasing LGS 710 is offset to intersect with the last known density of the drilling mud.

Figure 8:
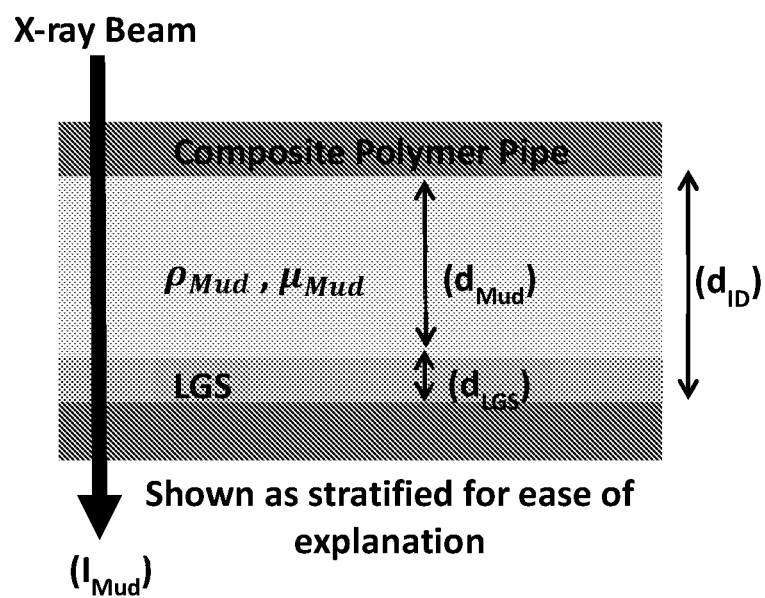
FIG. 8 illustrates a model-based method for determining a density of a process material flowing through the x-ray mass flow rate sensor suitable for implementing the several embodiments of the disclosure.

FIG. 8 illustrates a model-based method for determining a density of a process material flowing through the x-ray mass flow rate sensor suitable for implementing the several embodiments of the disclosure.

In the model based approach, experiments are conducted in-lab to determine the μm's of the expected mud constituents. Beer Lamberts law is then used to measure the density of field muds using the real-time calibrated density GL values and these μm's.

For a given homogeneous mud sample, irrespective of the mud constituents, its mass attenuation coefficient ($\mu_{m\_mud}$) can be determined using Equation 2.

$$\mu_{m\_mud} = -\ln\left(\frac{I_t}{I_{0t}}\right) / \rho_{mud} t, \quad \text{Equation 2}$$

where $I_t$ is the calibrated density GL value determined by the processor 120 based on incident x-rays on the detector 210 after attenuation by the mud sample (Gray Level value), $I_{0t}$ is the x-ray intensity incident on the detector when the polymer pipe 212 is empty (i.e., filled with air and with units of Gray Level value), $\mu_{m\_mud}$ is the mass attenuation coefficient of the homogeneous mud sample (cm$^2$/g), $\rho_{mud}$ is the density of the mud sample as measured by the standard API density cup (g/cm$^3$), and t is the depth of the polymer pipe 212 (cm).

When an unkown amount of suspensions (with a predetermined mass attenuation coefficient ($\mu_{m\_suspension}$) and density ($\rho_{suspension}$), get entrained in the mud, the proportion of the original mud changes. The unknown proportions of the original mud and the suspensions in the sample bottle are indicated by Equation 3.

$$t = t_{mud} + t_{suspension} + t_{air} \quad \text{Equation 3,}$$

where $t_{mud}$ is the unkown proportion of the original mud (cm), $t_{suspension}$ is the unknown proportion of suspensions in the drilling mud (cm), and $t_{air}$ is the unknown proportion of air in the drilling mud (cm). Since the mud sample is non-aerated the value of $t_{air}$ may be 0.

A new value of the x-ray intensity ($I_{t\_new}$) incident on the detector, as indicated by the calibrated density GL value in a subsequent radiographic image, upon attenuation by the unknown proportion of the original mud and entrained suspensions can be determined by using Equation 4.

$$I_{t\_new} = I_{0t} * \exp-(\mu_{m\_mud}\rho_{mud}t_{mud} + \mu_{m\_suspension}\rho_{suspension}t_{suspension} + \mu_{m\_air}\rho_{air}t_{air}), \quad \text{Equation 4,}$$

where $\mu_{m\_air}$ is the mass attenuation of air and $\rho_{air}$ is the density of air.

Equation 4 states that the total x-ray attenuation by the modified mud sample is equal to the x-ray attenuation by its individual constituents (i.e., the unknown proportions of the original mud, suspensions and air). Values of $t_{mud}$ and $t_{suspensions}$ can be calculated using Equations 3 and 4, which are the only two unknown quantities. Equation 5 is then used to calculate the density of the modified mud.

$$\rho_{modified\_mud} = (\rho_{mud}t_{mud} + \rho_{suspensions}t_{suspensions} + \mu_{m\_air}\rho_{air}t_{air})/t, \quad \text{Equation 5,}$$

Finally:

$$\rho_{mud} = \rho_{modified\_mud}, \quad \text{Equation 6.}$$

Equations 2 through 6 can be used by the processor 120 to recursively determine the density of the drilling mud in real-time.

The RFM 606 is shown in the examples of FIGS. 6A-6C in an upper location of the detection area 504. The RFM 606 is positioned in the detection area 504 at a location where x-rays emitted by the x-ray source 206 pass through the fully extended pistons 406 of the flow rate mechanism 400 before being detected by the x-ray detector 210. For example, as shown in FIG. 6B, a lowest portion of the RFM 606 is defined by a line that intersects a lowest area of the pistons 406 and the x-ray source 206. Likewise, a highest portion of the RFM 606 is defined by a line that intersects a highest area of the pistons 406 (excluding other components of the flow rate mechanism 400) and the x-ray source 206. Therefore the pistons 406 of the flow rate mechanism 400 are placed within the RFM 606 of the detection area 504 of the x-ray mass flow rate sensor 106. As above, an average flow rate GL value is determined based on all the pixel values in the RFM 606. The transfer function determined based on the RCM 604 may be applied to all of the individual pixels in the RFM 606 or to the determined average flow rate GL value to produce a calibrated flow rate GL value.

As discussed above, each of the pistons 406 attenuates the x-rays emitted by the x-ray source 206. As one or more of the pistons 406 are displaced by the flow of process material through the x-ray mass flow rate sensor 106, fewer x-rays are attenuated by the pistons 406 before being detected in the RFM 606. Therefore, a lower flow rate of the process material will result in a lower calibrated flow rate GL value due to a smaller displacement of the pistons 406 as compared to a higher flow rate of the process material, which will result in a higher calibrated flow rate GL value due to a larger displacement of the pistons 406. In other words, as the flow rate of the process material increases, the calibrated flow rate GL value likewise increases due to the increase amount of x-rays reaching the RFM 606. The calibrated flow rate GL value continues to increase with piston deflection until the piston is completely out of the path of the x-rays at which point the calibrated flow rate GL value stabilizes. As the flow rate of the process material decreases, the calibrated flow rate GL value likewise decreases due to the attenuation of x-rays from the piston before reaching the RFM 606.

As discussed above, the process material exerts a force on the bottom surface of the pistons 406, whose deflection is directly proportional to the amount mass flow rate through the polymer pipe 212. The calibrated flow rate GL value from the RFM 606 is a function of the deflection of the pistons 406 and the density of the process material. Since the fluid density is estimated in real-time, the calibrated flow rate GL value can be used to back calculate the deflection of the pistons and thereby determine the volumetric flow rate of the process material. The piston deflection can be determined from Equation 7.

$$x_i = -\frac{W_p}{k_i} + \frac{(c_d * A * \rho_{fluid} * v^2)}{2 * k_i}, i = \{1, 2, 3\}, \quad \text{Equation 7}$$

where k is the spring constant (N/cm), x is the deflection of the piston (cm), $W_p$ is the weight of piston (g), $c_d$ is the drag coefficient for the piston (unitless), A is the area of piston perpendicular to the direction of fluid flow (cm$^2$), and v is the velocity of the process material (cm/sec).

Equation 8 can be rearranged to find the fluid velocity as shown in Equation 8.

$$v = \sqrt{\frac{2(k_i * x_i + W_d)}{c_d * A * \rho_{fluid}}}, i = \{1, 2, 3\}, \quad \text{Equation 8}$$

In Equation 8 the spring constant, area/weight of piston and the drag coefficient are all pre-determined quantities. Fluid density is determined real-time as discussed above and is therefore also known. Piston deflection 'x' can be determined by plugging different values of 'x' in Equation 9 until the calculated 'I(x)' value in Equation 9 matches the calibrated flow rate GL value at the RFM 606. Equation 9 is a modified version of the Beer Lamberts Law (Equation 1). The calibrated flow rate GL value at the RFM 606 is directly proportional to piston deflection since an increase in piston deflection allows for greater x-ray intensity to be deposited at the RFM 606, resulting in larger GL values.

$$I(x) = \frac{1}{N*M} \sum_{m=-\frac{M}{2}}^{\frac{M}{2}} \sum_{n=1}^{N} I_0 * \exp - \quad \text{Equation 9}$$

$$\left(\mu_{m_{fluid}} * \rho_{fluid} * t_{fluid\_flow}\left(x, \alpha_0 + \frac{\Delta\alpha * n}{N}, \frac{\Delta\theta * m}{M}\right) + \mu_{m_{piston}} * \rho_{piston} * t_{piston}\left(x, \alpha_0 + \frac{\Delta\alpha * n}{N}, \frac{\Delta\theta * m}{M}\right)\right), \{(n, m) \in Z > 0\},$$

where, I(x) is the expected average intensity value at the RFM 606 as a function of piston deflection (GL), N is the number of pixels along the length of the RFM 606 (in the direction of deflection), M is the number of pixels along the width of RFM 606, $t_{fluid\_flow}$ is the thickness of fluid for flow measurement (cm), $\mu_{m\_piston}$ is the mass attenuation coefficient of homogeneous piston (cm$^2$/g), $r_{piston}$ is the density of homogeneous piston (g/cm$^3$), $t_{piston}$ is the fluid velocity (in/sec), $\alpha_0$ is the angle between the bottom of RFM 606 and a centerline of the x-ray source 206 (radians), $\Delta\alpha$ is the angle between bottom and top of RFM 606 (radians), AO is the angle along the width of the RFM 606 (radians).

Once 'x' is known fluid volumetric flow rate through the pipe can be determined using Equation 10.

$$V = v*B, \quad \text{Equation 10,}$$

where, V is the volumetric flow rate through pipe (cm$^3$/sec), and B is the cross-sectional area of the polymer pipe 212 (cm$^2$).

Flow measurements may alternatively be determined by measuring the movement of one or more tracers along the RFM. For example, a tracer material, such as tungsten carbide beads, bubbles, or other such material detectable by x-rays, may be introduced into the process material. In some implementations, high gravity solids (HGS) introduced into the process material may be used as tracer materials. Upon a tracer material being detected in a first radiograph image in the RFM, the tracer material may be tracked over time in subsequent images to determine a velocity of the tracer material and hence a flow rate of the process material.

As disclosed herein, the x-ray mass flow rate sensor 106 provides for density and flow measurements on normal and high-pressure lines when drilling of complex wells with narrow drilling windows. Accordingly, the x-ray mass flow rate sensor 106 is an enabling technology for managed pressure drilling (MPD) applications, which requires accurate density and flow measurements on the high-pressure flow-line into the well (the "inlet") as well as the low-pressure flow-line out of the well (the "outlet"). There currently is no good measurement techniques for measuring flow and density on the high-pressure inlet, and density and flow are mostly calculated (e.g. flowrate from mud pump strokes) rather than measured.

The x-ray mass flow rate sensor 106 described herein may be used as a replacement for gamma ray meters. In oil and gas applications, gamma ray meters are typically used on the high pressure well inlet to determine drilling fluid density. They are also used in many multiphase production stage meters to determine the water fraction in hydrocarbons.

The x-ray mass flow rate sensor 106 described herein may be used in custody transfer applications which are currently dominated by a Coriolis meter and an Ultrasonic meter.

While the above examples are provided with respect to drilling mud in a drilling rig, gamma ray meters are extensively used in mining and metallurgical applications. Accordingly, the mass flow rate sensor 106 of the pending application can be used as a substitute for gamma ray meters in various such applications, such as smelter furnace charge level control, control of continuous casting machines, uniform bed depth on sintering machines, bed depth control in sinter clinker coolers, thickener underflow density measurement and control, control of flotation process, control of heavy media separation process, solvent extraction process, coal bulk density control prior to coking, control of cyclone classifiers, and acid concentration control in pickling baths.

While described above in examples using drilling mud, the process material can be a fluid, slurry, single phase solution, multi-phase solution, molten flow, or the like. In some implementations, the process material is a homogeneous slurry, where the density changes over time based on changing a concentration of only a single constituent solid at a time. In some implementations, the density changes over time based on changing a concentration of more than one constituent solid at a time, but a rate of change in the concentration of all the changing constituent solids except one is a known rate of change. In other words, the change in density could be due to more than one constituent, but the rate of the change of the other constituents is known.

While described herein for high-pressure process applications, the x-ray mass flow rate sensor 106 may be used to detect density and/or flow rate of process materials in low-pressure (<5 ksi) processes as well.

It should be appreciated that the logical operations described herein with respect to the various figures may be implemented (1) as a sequence of computer implemented acts or program modules (i.e., software) running on a computing device (e.g., the computing device described in FIG. 9), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 9:
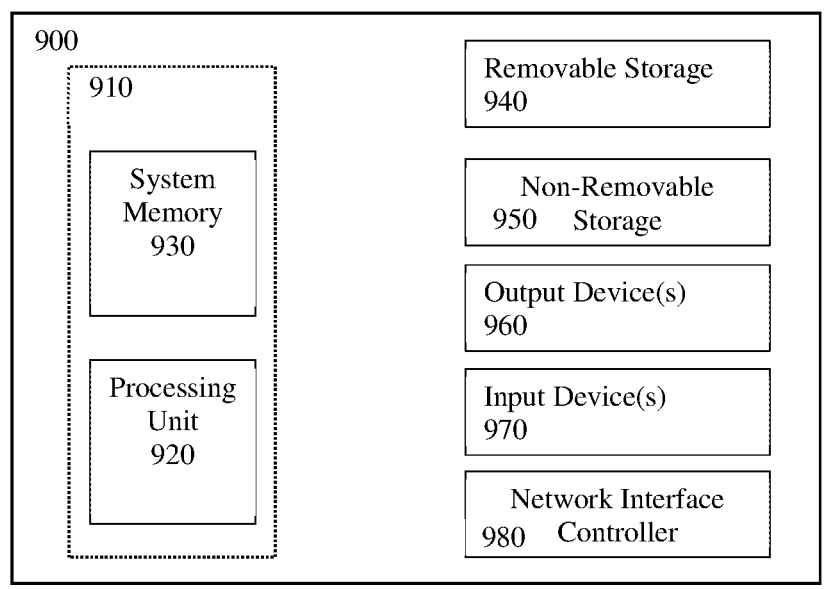
FIG. 9 illustrates an exemplary computer system suitable for implementing the several embodiments of the disclosure.

Referring to FIG. 9, an example computing device 900 upon which embodiments of the invention may be implemented is illustrated. For example, the processor 120 described herein may be implemented as a computing device, such as computing device 900. It should be understood that the example computing device 900 is only one example of a suitable computing environment upon which embodiments of the invention may be implemented. Optionally, the computing device 900 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 900 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 900 to provide the functionality of a number of servers that is not directly bound to the number of computers in the computing device 900. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 900 typically includes at least one processing unit 920 and system memory 930. Depending on the exact configuration and type of computing device, system memory 930 may be volatile (such as random access memory (RAM)), non-volatile (such as read-only memory (ROM), flash memory, etc.), or some combination of the two. This most basic configuration is illustrated in FIG. 9 by dashed line 910. The processing unit 920 may be a standard programmable processor that performs arithmetic and logic operations necessary for operation of the computing device 900. While only one processing unit 920 is shown, multiple processors may be present. Thus, while instructions may be discussed as executed by a processor, the instructions may be executed simultaneously, serially, or otherwise executed by one or multiple processors. The computing device 900 may also include a bus or other communication mechanism for communicating information among various components of the computing device 900.

Computing device 900 may have additional features/functionality. For example, computing device 900 may include additional storage such as removable storage 940 and non-removable storage 950 including, but not limited to, magnetic or optical disks or tapes. Computing device 900 may also contain network connection(s) 980 that allow the device to communicate with other devices such as over the communication pathways described herein. The network connection(s) 980 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 900 may also have input device(s) 970 such as a keyboards, keypads, switches, dials, mice, track balls, touch screens, voice recognizers, card readers, paper tape readers, or other well-known input devices. Output device(s) 960 such as a printers, video monitors, liquid crystal displays (LCDs), touch screen displays, displays, speakers, etc. may also be included. The additional devices may be connected to the bus in order to facilitate communication of data among the components of the computing device 900. All these devices are well known in the art and need not be discussed at length here.

The processing unit 920 may be configured to execute program code encoded in tangible, computer-readable media. Tangible, computer-readable media refers to any media that is capable of providing data that causes the computing device 900 (i.e., a machine) to operate in a particular fashion. Various computer-readable media may be utilized to provide instructions to the processing unit 920 for execution. Example tangible, computer-readable media may include, but is not limited to, volatile media, non-volatile media, removable media and non-removable media implemented in any method or technology for storage of information such as computer readable instructions, data structures, program modules or other data. System memory 930, removable storage 940, and non-removable storage 950 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 920 may execute program code stored in the system memory 930. For example, the bus may carry data to the system memory 930, from which the processing unit 920 receives and executes instructions. The data received by the system memory 930 may optionally be stored on the removable storage 940 or the non-removable storage 950 before or after execution by the processing unit 920.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An x-ray mass flow rate sensor, comprising:
   a pipe having a density less than 2.8 SG;
   an x-ray source coupled to the pipe and configured to emit an x-ray beam therethrough;
   an x-ray detector coupled to the pipe and arranged to detect x-rays from the x-ray beam after having passed through the pipe, the x-ray detector configured to produce a measure of intensity of x-rays received from the x-ray source; and
   a calibration rod coupled to the pipe and arranged within a path of the x ray beam, the calibration rod comprising two materials of known density.

2. The x-ray mass flow rate sensor of claim 1, further comprising:
   a flow rate mechanism coupled to the pipe, the flow rate mechanism comprising a piston and a spring, wherein the piston of the flow rate mechanism is arranged within a path of the x-ray beam.

3. The x-ray mass flow rate sensor of claim 2, wherein the piston is configured to be displaced along a displacement path and compress the spring proportional to a mass flow rate of a fluid through the pipe.

4. The x-ray mass flow rate sensor of claim 2, wherein the flow rate mechanism comprises a plurality of pistons with a respective plurality of springs, each of the pistons are arranged within a path of the x-ray beam.

5. The x-ray mass flow rate sensor of claim 1, wherein the x-ray beam is a polychromatic x-ray beam.

6. The x-ray mass flow rate sensor of claim 1, wherein the pipe is a polymer pipe and has a density between 1.3-1.7 SG and a pressure rating of greater than or equal to 7500 psi.

7. The x-ray mass flow rate sensor of claim 1, wherein the x-ray source is less than or equal to 450 kV and the x-ray source draws less than or equal to 6000 W.

8. The x-ray mass flow rate sensor of claim 1, wherein the calibration rod extends for a length equal to the diameter of the pipe.

9. The x-ray mass flow rate sensor of claim 8, wherein the calibration rod comprises a rod of a first of the two materials of known density surrounded by a ring of a second of the two materials of known density.

10. The x-ray mass flow rate sensor of claim 9, wherein a diameter of a first end of the calibration rod is smaller than a diameter of a second end of the calibration rod.

11. The x-ray mass flow rate sensor of claim 1, wherein the x-ray detector is configured to produce the measure of intensity of x-rays received from the x-ray source at a frequency of 1 Hz.

12. The x-ray mass flow rate sensor of claim 1, wherein the x-ray detector is a charge coupled device (CCD) image sensor or a photomultiplier tube (PMT).

13. The x-ray mass flow rate sensor of claim 1, further comprising:
    a processor configured to receive the measure of intensity of x-rays received from the x-ray source produced by the x-ray detector.

14. The x-ray mass flow rate sensor of claim 13, wherein the processor is configured to produce an average gray level (GL) value of indicative of an average intensity of x-rays received from the x-ray source in each of a plurality of regions of a detection area.

15. The x-ray mass flow rate sensor of claim 14, wherein the plurality of regions comprise a calibration region, a density measurement region, and a flow rate region.

16. The x-ray mass flow rate sensor of claim 15, wherein the calibration region comprises a first area that measures x-ray attenuation through a first of the two materials of known density to produce a reference high GL value and a second area that measures x-ray attenuation through a second of the two materials of known density to produce a reference low GL value.

17. The x-ray mass flow rate sensor of claim 16, wherein the processor is configured to determine a density of a material flowing through the pipe based on a density GL value determined from the density measurement region.

18. The x-ray mass flow rate sensor of claim 17, wherein the processor is configured to determine a mass flow rate of the material flowing through the pipe based upon the density and a flow rate determined based on a flow rate GL value determined from the flow rate region.

19. The x-ray mass flow rate sensor of claim 18, wherein the density GL value and the flow rate GL value are calibrated based on the reference high GL value and the reference low GL value.

20. The x-ray mass flow rate sensor of claim 15, wherein the processor is configured to process the x-rays received from the x-ray source in the flow rate region of the detection area to determine a velocity of a tracer material traversing the flow rate region.

* * * * *

UNITED STATES PATENT AND TRADEMARK OFFICE
CERTIFICATE OF CORRECTION

PATENT NO. : 11,629,984 B2
APPLICATION NO. : 17/046073
DATED : April 18, 2023
INVENTOR(S) : Vivek Singhal et al.

It is certified that error appears in the above-identified patent and that said Letters Patent is hereby corrected as shown below:

In the Claims

In Column 21, Line 15 of Claim 1, delete "x ray" and insert --x-ray--

Signed and Sealed this
Eleventh Day of July, 2023

Katherine Kelly Vidal
*Director of the United States Patent and Trademark Office*